Patented Apr. 14, 1925.

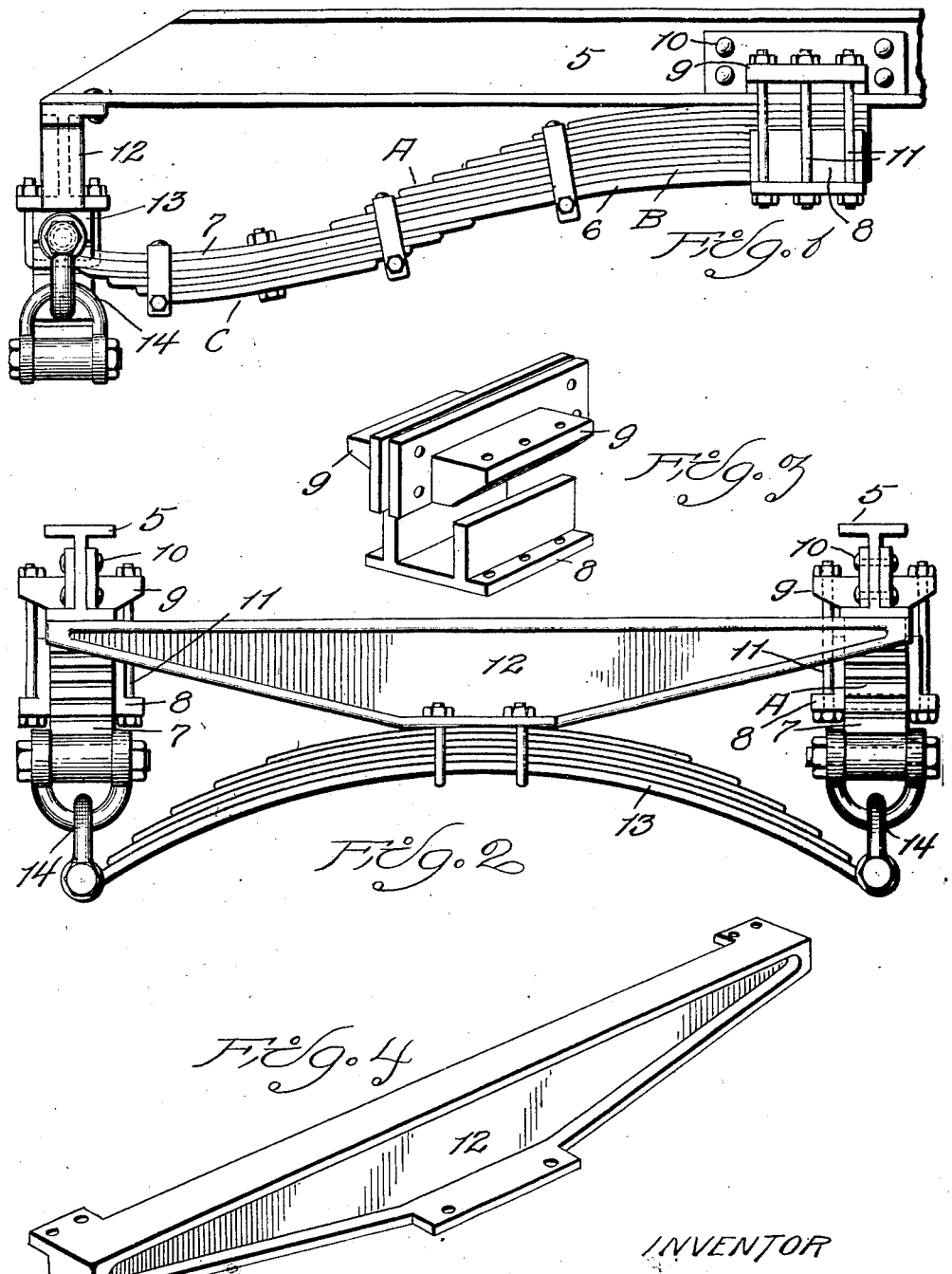

1,533,418

UNITED STATES PATENT OFFICE.

CHRISTIAN J. HUG, OF HIGHLAND, ILLINOIS, ASSIGNOR TO THE HUG COMPANY, OF HIGHLAND, ILLINOIS, A CORPORATION OF ILLINOIS.

VEHICLE SPRING.

Application filed July 5, 1923. Serial No. 649,626.

*To all whom it may concern:*

Be it known that I, CHRISTIAN J. HUG, a citizen of the United States of America, residing at Highland, in the county of Madison and State of Illinois, have invented certain new and useful Improvements in Vehicle Springs, of which the following is a specification, reference being had therein to the accompanying drawing.

My invention relates to improvements in vehicle springs, particularly of the class intended for the rear end of a vehicle having a rearwardly dumping body, whose contents are to be discharged beyond and clear of the rear wheels of the vehicle.

The invention comprises a transverse spring, supported by a pair of side-springs, each of which side-springs comprises a forward cantilever-spring member and a rear leaf-spring member, and these members having one or more basic spring-leaves in common; the rear leaf-spring member being mounted upon the axle of the vehicle.

The subject-matter of the invention is intended primarily for the carriage of heavy loads, and embodies desirable resiliency with adequate and necessary tensile strength.

Drawings.

Fig. 1 is a side elevation of a spring embodying my invention.

Fig. 2 is a rear elevation of the same.

Fig. 3 is a perspective view of the mountings whereby the forward ends of the side-spring members are secured to the chassis.

Fig. 4 is a perspective view of the transverse truss member to which the transverse spring member is attached.

Description.

The side-sills of the chassis to which my spring is to be attached are numbered 5. The side-spring members A are of laminated structure as shown, the leaves 6 and 7 extending the entire length of the spring A, the forward or cantilever section or portion B being built up by a series of leaves imposed upon the upper face of the leaf 7, while the rear or leaf-spring portion or section C is formed by the addition of a series of leaves mounted beneath the leaf 6.

The front terminal of the spring A is mounted in a grooved saddle 8 and suspended from the side-sill 5 by means of bracket-lugs 9 (secured to the web of the sill 5 by rivets 10) and bolts 11.

The transverse sill 12 is secured at its ends to the lower faces of the rear ends of the sills 5, and holds the leaf spring 13 whose ends in turn are secured by clevises 14 to the rear ends of the side-springs A.

The point of axle attachment is preferably on the lower face of the leaf-spring section C, the axle being attached thereto by any of the forms of clamp now commonly used for that purpose. But because of the use of the leaves 6 and 7, as above described, the axle may be attached to side spring members A at any desired point throughout the length of that member, the continuity of said leaves 6 and 7 serving to distribute the strains incident to load-carrying throughout the entire length of the member A.

Claims.

1. A vehicle spring comprising a cantilever section and a leaf-spring section, said sections being composed of relatively short leaves built upon one or more leaves common to both sections.

2. A vehicle spring comprising two side springs each embodying a cantilever-section and a leaf-spring section; and a transverse leaf-spring connecting the ends of said leaf-spring sections of said side-springs.

3. A vehicle spring comprising two side springs each embodying a leaf extending throughout the entire length of the spring, and a cantilever-section, and a leaf-spring section both built upon or supported by said first named leaf.

4. A vehicle spring comprising two side springs each embodying a leaf extending throughout the entire length of the spring, and a cantilever-section, and a leaf-spring section both built upon or supported by said first named leaf, and a transverse leaf-spring connecting the ends of the said side springs.

In testimony whereof I have hereunto affixed my signature.

CHRISTIAN J. HUG.